United States Patent [19]
Moquin

[11] Patent Number: 6,023,505
[45] Date of Patent: Feb. 8, 2000

[54] SYSTEM AND METHOD FOR PROVIDING A BUSY SIGNAL TO A COMMUNICATION

[75] Inventor: Thomas Joseph Moquin, Alpharetta, Ga.

[73] Assignee: BellSouth Intellectual Property Corporation, Wilmington, Del.

[21] Appl. No.: 08/893,794

[22] Filed: Jul. 11, 1997

[51] Int. Cl.[7] .................................................. H04M 3/42
[52] U.S. Cl. ........................... 379/229; 379/207; 379/220
[58] Field of Search .................................... 379/201, 204, 379/207, 210, 211, 213, 219, 220, 221, 265, 266, 229, 230, 231, 234

[56] References Cited

U.S. PATENT DOCUMENTS

| | | | |
|---|---|---|---|
| 5,432,845 | 7/1995 | Burd et al. ............................... | 379/210 |
| 5,463,683 | 10/1995 | Collins et al. ........................... | 379/201 |
| 5,481,602 | 1/1996 | Griffiths et al. . | |
| 5,521,963 | 5/1996 | Shrader et al. ........................... | 379/60 |
| 5,521,970 | 5/1996 | Herrick et al. ........................... | 379/201 |
| 5,530,931 | 6/1996 | Cook-Hellberg et al. ............... | 379/211 |
| 5,590,186 | 12/1996 | Liao et al. ................................ | 379/210 |
| 5,592,541 | 1/1997 | Fleischer, III et al. .................. | 379/211 |
| 5,600,710 | 2/1997 | Weisser, Jr. et al. ..................... | 379/67 |
| 5,710,809 | 1/1998 | Mashinsky ............................... | 379/207 |
| 5,729,598 | 3/1998 | Kay .......................................... | 379/115 |
| 5,745,553 | 4/1998 | Mirville et al. .......................... | 379/67 |
| 5,754,630 | 5/1998 | Srinvivasn ................................ | 379/88 |
| 5,764,748 | 6/1998 | Rosenthal et al. ....................... | 379/215 |
| 5,809,128 | 9/1998 | McMullin ................................ | 379/215 |
| 5,854,835 | 12/1998 | Montgomery et al. .................. | 379/119 |
| 5,867,568 | 2/1999 | Ackerman et al. ....................... | 379/201 |

FOREIGN PATENT DOCUMENTS

| | | |
|---|---|---|
| 0 498 593 A2 | 3/1992 | European Pat. Off. . |
| 0 550 975 A2 | 10/1992 | European Pat. Off. . |

*Primary Examiner*—Scott Wolinsky
*Attorney, Agent, or Firm*—Jones & Askew, LLP

[57] ABSTRACT

A system and method to provide a busy signal to a communication without a terminating network element providing answer supervision and without the originating caller associated with the communication being charged for the communication. A communication that has been forwarded over an integrated services digital network (ISDN) interface connection from a central office to a terminating network element for further routing of the communication to a terminating unit is accepted at the terminating network element and an ISDN interface connection is made, but answer supervision with respect to the communication is not provided. Upon a determination that the terminating unit to which the communication would otherwise be forwarded is busy, the terminating network element provides an ISDN release complete message with respect to the communication to the central office. The ISDN release complete message instructs the central office to play a busy signal to the communication. The terminating network element also releases the ISDN interface connection to the communication. In response to receipt of the ISDN release complete message from the terminating network element, the central office plays a busy signal to the communication.

7 Claims, 3 Drawing Sheets

1

SYSTEM AND METHOD FOR PROVIDING A BUSY SIGNAL TO A COMMUNICATION

FIELD OF THE INVENTION

The present invention generally relates to the field of telecommunications, and more particularly, relates to the field of busy signal provision to a communication which otherwise would have been routed for connection to a terminating unit.

BACKGROUND OF THE INVENTION

The provision of enhanced telecommunication services by service providers has raised some problematic issues with respect to the implementation of these services and customer billing therefor. Such issues have arisen in the context of certain call forwarding services and other similar telecommunication services that provide enhanced services that make use of a terminating network element such as an intelligent peripheral (IP) or a service circuit node. These types of services typically have been implemented such that a communication may be routed from an originating caller through a telecommunications network and then terminated to the terminating network element. The terminating network element then may provide for further routing of the communication to a terminating unit or provide other call treatment as appropriate.

This implementation of routing a communication to or through a terminating network element works well when the terminating unit or a call rescue location such as a voice mail service is available for connection to the communication. This implementation has a drawback when the terminating unit is busy and there is no call rescue location for connection of the communication. In that case, the terminating network element must provide answer supervision to the communication in order to provide a busy signal to the communication. With the provision of answer supervision, the connection of the communication is considered complete to the terminating network element for billing purposes. The originating caller would be billed for the communication as if it had been answered. The cost of this billing may be significant if the connection of the communication to the terminating network element is toll.

A telecommunications service provider must take steps to make sure that this billing for a call to a busy terminating unit does not occur. Pursuant to state and federal regulations of public telecommunication services, generally, an originating caller may not be billed for a call to a busy terminating unit. Thus, two unsatisfactory solutions have been devised to overcome the drawback of an originating caller being improperly billed when a communication to a busy terminating unit is answered through the provision of a busy signal by a terminating network element. The first unsatisfactory solution is that a service provider faced with an enhanced service that has this drawback has dropped this enhanced service from its portfolio of enhanced services offered to subscribers. The unsatisfactory nature of this first solution is readily apparent in that a service provider desires to offer as many and as varied enhanced services as possible to remain competitive with other service providers.

The second unsatisfactory solution is that the originating caller of the communication is not provided with any indication that the terminating unit is busy. Rather, the originating caller continues to hear ringing until the caller tires of the noise. With continuous ringing, the originating caller is not billed for a communication that was never connected to the appropriate terminating unit. Continuous ringing is an unsatisfactory solution to most subscribers for several different reasons. Business owners are unsatisfied with this solution because it may leave customers with the wrong impression. A customer who calls a business and who hears continuous ringing may deduce that the business is not service oriented with respect to customers who call the business. Business owners are especially frustrated by this because cold call customers, i.e., those customers who do not have a prior association or affiliation with the business, are unlikely to return a telephone call to a business which appears not to answer its telephone. In the private sector, a subscriber may be unsatisfied with the continuous ringing solution because it causes concern regarding the persons who are associated with the terminating unit. For example, a family member telephoning an ill or elderly parent may be concerned that the telephone line keeps ringing when the family member is relatively positive that the ill or elderly parent is present at the site of the telephone.

Therefore, there is a need in the art for a solution to the drawback of the implementation wherein a communication is routed to or through a terminating network element in order to provide enhanced services to the communication, wherein the terminating unit is busy and there is no call rescue location for connection of the communication, and wherein the provision of a busy signal by the terminating network element results in a billing charge to the originating caller even though the terminating unit is busy.

There is also a need in the art for a solution to the above referenced drawback that allows a service provider to retain the enhanced services that use this implementation in its portfolio of enhanced services available for subscription.

There is a further need in the art for a solution to the above referenced drawback that does not provide continuous ringing to the originating caller as the solution to the drawback.

SUMMARY OF THE PRESENT INVENTION

Stated generally, the present invention includes a system and method to provide a busy signal to a communication without a terminating network element providing answer supervision and without the originating caller being charged for the communication. Advantageously, the present invention allows a communication to be routed to or through a terminating network element in order to provide enhanced services to the communication. But if the terminating unit to which the communication is destined is busy, and there is no call rescue location for the communication, the present invention allows the service provider to retain the enhanced services with this implementation in its portfolio of services by providing a busy signal without charge to the originating caller. The provision of the busy signal to the communication in these circumstances is a more satisfactory solution to subscribers than the continuous ringing provided by other solutions.

More particularly described, the present invention includes a system to provide a busy signal to a communication which has been forwarded over an integrated services digital network (ISDN) interface connection from a central office to a terminating network element. Generally, in this system, the communication has been forward to the terminating network element for further routing of the communication to a terminating unit or for other call treatment. In the preferred embodiment of the system, the terminating network element is an intelligent peripheral (IP) or a service circuit node. The communication is accepted at the terminating network element and an ISDN interface connection is made, but answer supervision with respect to the communication preferably is not provided. Upon a determination that the terminating unit to which the communication would otherwise be forwarded is busy, the terminating network element provides a message with respect to the communication to the central office. In the preferred embodiment, this determination may also include a determination that no call rescue location is available or designated for routing of the communication. Also in the preferred embodiment, this message from the terminating network element is an ISDN release complete message. The message instructs the central office to play a busy signal to the communication. The terminating network element also releases the ISDN interface connection to the communication. In response to receipt of the message from the terminating network element, the central office plays a busy signal to the communication. In this manner, the originating caller associated with the communication hears a busy signal, but is not charged for the communication.

The present invention also provides a method for providing a busy signal to a communication that has been forwarded to the terminating network element. The busy signal is provided without the terminating network element providing answer supervision for the communication, and thereby without the originating caller being charged for the communication. Pursuant to an exemplary embodiment of the method, the communication is accepted over the ISDN interface connection at the terminating network element and an ISDN interface connection is established with respect to the communication by the terminating network element. In response to acceptance of the communication, the terminating network element determines the further routing of the communication. The terminating network element checks whether the terminating unit is busy through the use of data messages between the terminating network element and a central office. Typically, this central office is the central office that serves the terminating unit. If the terminating unit is busy, in the preferred method, the terminating network element determines whether there is a call rescue location designated for the communication. If there is a call rescue location designated for the communication, then the terminating network element routes the communication to the call rescue location and the method ends. Otherwise, the terminating network element provides a message to the central office which serves the terminating network element. This message instructs the central office to play a busy signal to the communication. In the preferred method, this message is an ISDN release complete message. The terminating network element also releases the ISDN interface connection to the communication. In response to receipt of the message from the terminating network element, the central office plays the busy signal to the communication. In this manner, the originating caller associated with the communication hears a busy signal, but is not charged for the communication.

Accordingly, it is an object of the present invention to provide a solution to the drawback of the implementation wherein a communication is routed to or through a terminating network element in order to provide enhanced services to the communication, wherein the terminating unit is busy and there is no call rescue location for connection of the communication, and wherein the provision of a busy signal by the terminating network element results in a billing charge to the originating caller even though the terminating unit is busy.

It is also an object of the present invention to provide a solution to the above referenced drawback that allows a service provider to retain the enhanced services that use this implementation in its portfolio of enhanced services available for subscription.

It is a further object of the present invention to provide a solution to the above referenced drawback that does not provide continuous ringing to the originating caller as the solution to the drawback.

Other features and advantages of the present invention will be apparent to persons skilled in the art from the following detailed description of exemplary embodiments accompanied by the attached drawings wherein identical reference numerals refer to like parts and steps in the various views.

DETAILED DESCRIPTION

This detailed description provides a general description of the present invention, and then provides a description of the preferred environment (FIG. 1) and operation of exemplary embodiments of the present invention therein. The detailed description concludes with a more particular description of the present invention through the use of a call flow diagram (FIG. 2) and a flow chart (FIG. 3).

Generally described, the present invention includes a method and system for providing a busy signal to a communication. More particularly described, the present invention operates in connection with a communication that has been forwarded over an integrated services digital network (ISDN) interface connection from a central office to a terminating network element. Generally, the communication has been forwarded to the terminating network element for further routing of the communication to a terminating unit or for other call treatment. The communication is accepted at the terminating network element and an ISDN interface connection is made, but answer supervision with respect to the communication is not provided. When a determination is made that the terminating unit to which the communication would otherwise be forwarded is busy and that there is no call rescue location designated for the communication, the terminating network element provides an ISDN release complete message with respect to the communication to the central office. The ISDN release complete message instructs the central office to play a busy signal to the communication. The terminating network element also releases the ISDN interface connection to the communication. In response to receipt of the ISDN release complete message from the terminating network element, the central office plays a busy signal to the communication.

Figure 1:
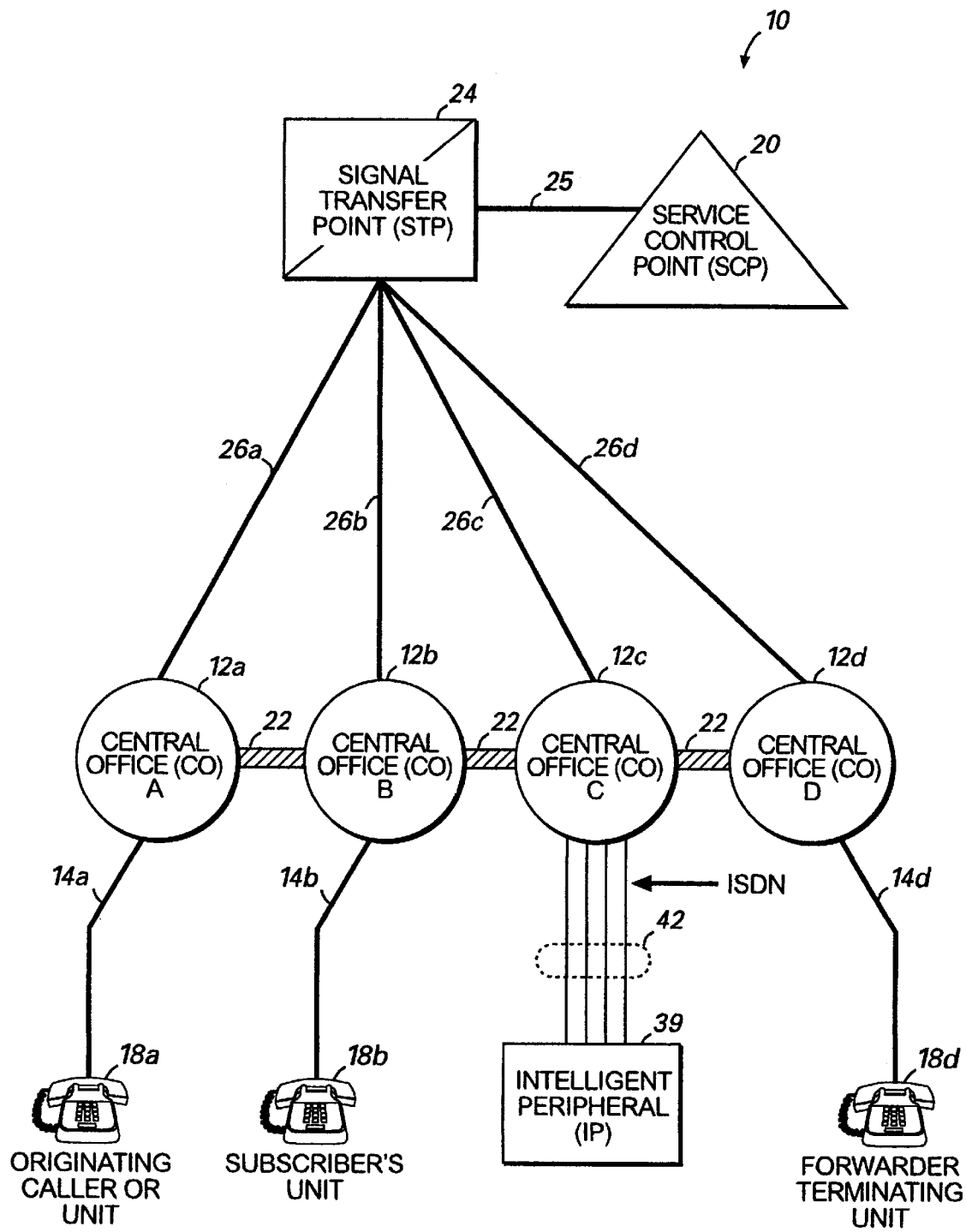
FIG. 1 is a block diagram illustrating the preferred environment of the preferred embodiment of the present invention.

Having generally described the present invention, a description of the preferred environment (FIG. 1) and operation of exemplary embodiments of the present invention therein are now provided. FIG. 1 is a block diagram illustrating a telecommunications network 10, and in particular, the typical interconnection of network elements such as may be present in the public switched telephone network (PSTN) and advanced intelligent network (AIN) elements thereof. Additional information regarding the telecommunications network 10 may be obtained from the commonly assigned patent to Weisser, U.S. Pat. No. 5,430,719, which is incorporated by reference herein. The elements of FIG. 1 are also used in FIG. 2 to describe the call flow of exemplary embodiments of the present invention.

Referring to FIG. 1, the present invention operates in connection with a communication placed by an originating caller using a telecommunications unit such as unit 18a and which communication is routed in a conventional manner through the telecommunications network 10 to a terminating network element such as intelligent peripheral (IP) 39. Prior to a more detailed description of the present invention, general information is provided with respect to the elements of the preferred environment. FIG. 1 provides illustrations of several terminating units commonly designated 18 such as unit 18a including a subscriber's unit 18b and a forwarded terminating unit 18d. Although telephones are illustrated as the pieces of terminating equipment or units in FIG. 1, those skilled in the art will understand that such pieces include other telecommunication devices such as facsimile machines, computers, modems, etc. As noted, one of the illustrated telephones 18a is designated as corresponding to the originating caller (also referred to as "calling party" "caller" or as "source"). Although an originating caller is generally referred to herein as a person, those skilled in the art will understand that an originating caller may be a device such as a facsimile machines, computer, modem, etc. Also as noted, the present invention operates in connection with a "communication". The term "communication" is used herein to include all messages or calls that may be exchanged between an originating caller and a network element, terminating unit or person answering a call.

As further illustrated in FIG. 1, each of the terminating units 18a, 18b and 18d is shown as connected by a respective plurality of subscriber lines 14a, 14b and 14d to a central office (A, B and D) 12a, 12b and 12d. A central office C also is illustrated. These central offices are preferably SSP switches (also referred to as "SSP"s). "SSP" is an acronym for service switching point. Generally, an SSP includes intelligent network functionality including appropriate hardware and software so that, when a set of predetermined conditions are detected, the SSP initiates a trigger for a predetermined state of a call on a subscriber's directory number, generates the trigger as an appropriate message to be sent out over the telecommunications network, and suspends handling of a call until the SSP receives a reply from the network instructing the SSP to take certain action.

Still referring to FIG. 1, switches 12a, 12b, 12c and 12d are interconnected by a plurality of trunk circuits indicated as 22 in FIG. 1. These are the voice path trunks that interconnect the central offices to connect communications. As those skilled in the art will understand, each of the central offices 12a–12d is connected to a local signal transfer point (STP) 24 via respective data links 26a, 26b, 26c and 26d. Also connected to STP 24 over data link 25 is the local service control point (SCP) 30. As is known to those skilled in the art, among the functions performed by SCPs is the maintenance of network databases which are used in providing services, and in particular, in providing enhanced telecommunication services. In addition, SCPs include databases that identify particular service subscribers and the services to be accorded to these subscribers. All of these network elements (SSPs, STPs and SCPs) operate pursuant to the well known signaling protocol referred to as the Signaling System 7 (SS7) protocol.

In order to keep the processing of data and calls as simple as possible, a relatively small set of triggers is defined at the central offices for each call. A trigger in the Advanced Intelligent Network is an event associated with a particular subscriber line that generates a packet to be sent to an SCP. The trigger causes the SCP to query its database to determine which customized calling feature or enhanced service should be implemented for this particular call. The results of the database inquiry are sent back to the central office from SCP 30 through STP 24. The return packet includes instructions to the central office as to how to process the call. The instruction may be to take some special action as a result of a customized calling service or enhanced feature. In response to receiving the latter type message, the central office moves through its call states, collects the called digits, and generates further packets that are used to set up and route the call. Similar devices for routing calls among various local exchange carriers are provided by regional STPs (not shown) and regional SCPs (not shown).

The illustrated telecommunications network 10 also includes a terminating network element, and in particular includes an intelligent peripheral (IP) 39 as the terminating network element shown in FIG. 1. Those skilled in the art will be familiar with intelligent peripherals, or service circuit nodes, which are generally implemented by the same types of computers that embody the service control point 30. In addition to the computing capability and database maintenance features, intelligent peripheral (IP) 39 also includes voice and dual tone multifrequency (DTMF) signal recognition devices and voice synthesis devices. Intelligent peripheral (IP) 39 may be connected to other telecommunication network elements as necessary or appropriate. Intelligent peripherals, such as intelligent peripheral 39, are used principally when some enhanced feature or service is needed that requires an audio connection to the call or transfer of a significant amount of data to a caller over a switched connection during or following a call. As shown in FIG. 1, intelligent peripheral (IP) 39 is typically connected to one or more (but normally only a few) central offices via an Integrated Service Digital Network (ISDN) interface connection 42 such as the connection 42 between intelligent peripheral (IP) 39 and central office C 12c. Preferably, this ISDN interface connection 42 constitutes ISDN basic rate interface (BRI) lines. Thus, an intelligent peripheral (IP) may be viewed as a smart termination connected to an ISDN interface connection that may be used to provide enhanced or special services.

Although the preferred embodiment of the present invention contemplates the use of an intelligent peripheral (IP) as the terminating network element, other devices also may be used as terminating network elements. Such devices may include other service circuit nodes or service platforms with appropriate functionality.

As noted, the present invention operates in connection with a communication placed by an originating caller and routed in a conventional manner through the telecommunications network 10 to a terminating network element such as intelligent peripheral (IP) 39. Typically, a communication is routed to an intelligent peripheral so that enhanced services may be provided in connection with the communication. For example, enhanced call forwarding services such as the Flexible Call Forwarding service of BellSouth Corporation utilize the features of an intelligent peripheral (IP). To explain this example, assume that the subscriber associated with subscriber's unit 18b has subscribed to enhanced call forwarding service. The subscriber has arranged that all calls directed to the directory number associated with the subscriber's unit 18 be forwarded to the forwarded terminating unit 18d. The information regarding this arrangement for the forwarding of this subscriber's calls is stored at the intelligent peripheral (IP) 39. Pursuant to this enhanced call forwarding service, a trigger is placed on the line associated with the subscriber's unit 18b.

Figure 2:
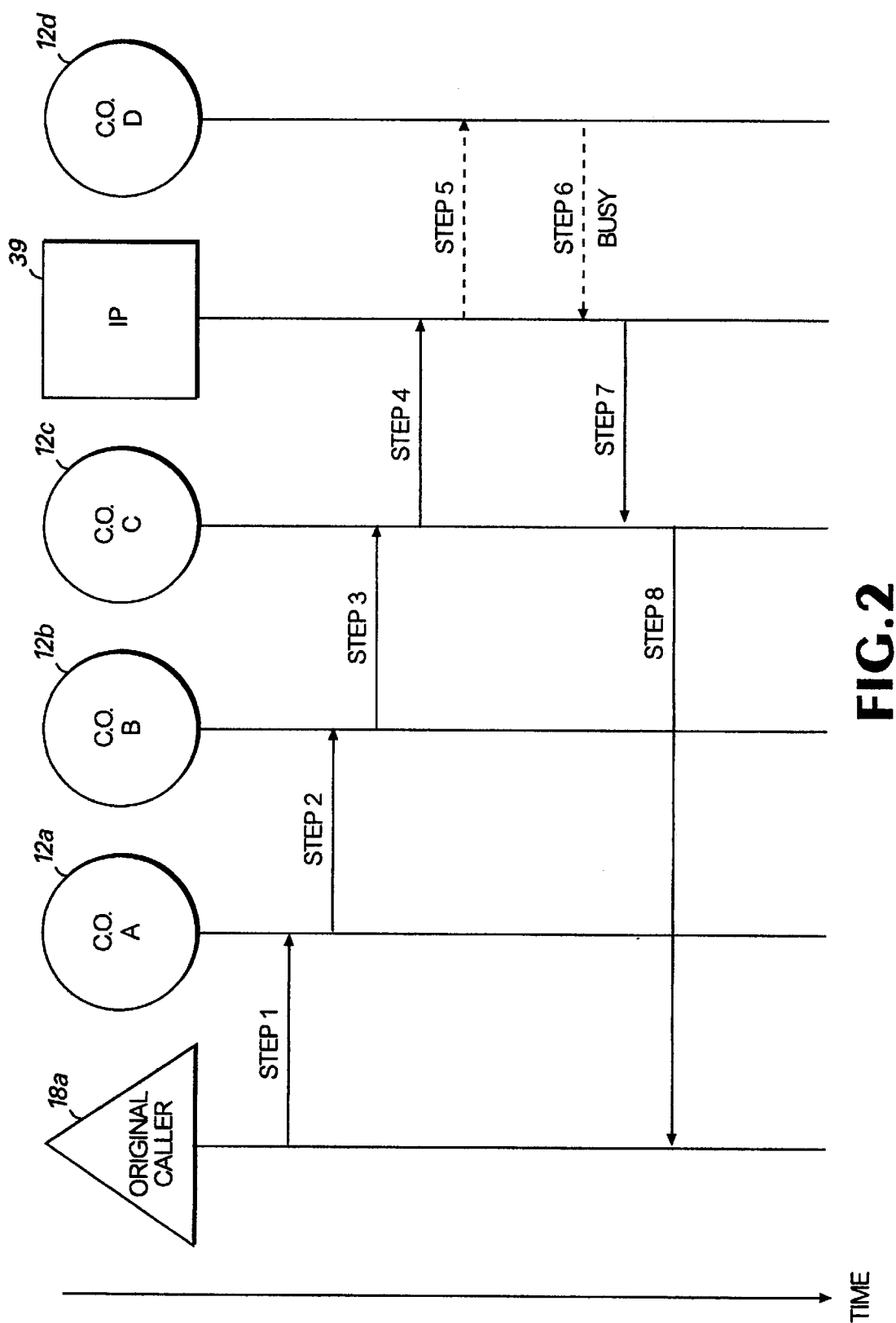
FIG. 2 is a call flow diagram of the preferred embodiment of the present invention.
Figure 3:
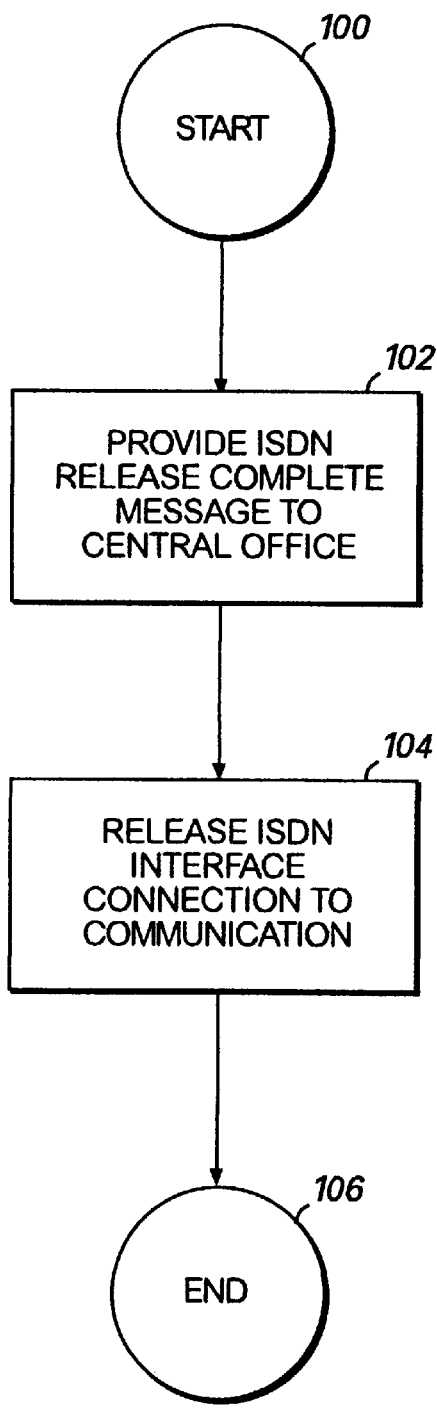
FIG. 3 is a flow chart of the steps of the of the preferred embodiment of the present invention.

The call flow of a communication directed to the subscriber who subscribes to exemplary enhanced call forwarding service is now provided with reference to the telecommunications network 10 of FIG. 1 and with respect to the call flow steps illustrated in FIG. 2. When originating caller 18a places a communication to the subscriber's directory number, the communication is routed in a conventional fashion over a voice path connection from originating unit 18a to its serving central office A 12a. (See step 1 of FIG. 2 wherein the voice path connections are illustrated by solid lines and the data path connections are illustrated by dashed lines). The communication is further routed in a conventional fashion over a voice path connection from central office A 12a through the network 10 as necessary to the central office B 12b serving the subscriber's unit 18b. (See step 2 of FIG. 2). As a result of the provision of the trigger on the subscriber's line, the central office B 12b makes an inquiry through STP 24 of SCP 30 for further call routing instructions. SCP 30 looks up the appropriate information in its subscriber databases, notes that this subscriber has invoked enhanced call forwarding services, and provides (through STP 24) the central office B 12b with instructions to route the call to the intelligent peripheral (IP) 39. To route the communication to the intelligent peripheral (IP) 39, central office B 12b routes the communication in a conventional fashion over a voice path connection to central office C 12c, which serves intelligent peripheral (IP) 39. (See step 3 of FIG. 2).

Upon receipt of the communication, central office C 12c further routes the communication in a conventional fashion over the ISDN interface connection 42 to intelligent peripheral (IP) 39. (See step 4 of FIG. 2). It should be understood that this communication is routed via a message trunk or voice channel setup, but that there is not a voice path completed until answer supervision is received. The communication is accepted at the terminating network element and an ISDN interface connection is made, but answer supervision with respect to the communication preferably is not provided by the intelligent peripheral (IP) 39. In other words, no conventional message such as the Send Answer message in the ISDN protocol is provided by the service circuit node 39 to the central office 12c. The ISDN answer supervision is withheld to prevent charges to the customer until the forwarded location completes the communication by accepting the communication. The originating caller 18a continues to hear ringing. The intelligent peripheral (IP) 39 checks its appropriate data bases, tables or other information sources in a conventional manner in order to determine what type of call treatment is applicable to this communication. Based upon the previous arrangement made by the subscriber in the example, the intelligent peripheral (IP) 39 determines that the communication is to be routed to the forwarded terminating unit 18d, which is served by central office D 12d. In a conventional manner, the intelligent peripheral (IP) checks the status of the forwarded terminating unit 18d by data message exchange with the central office D serving the forwarded terminating unit 18d. (See steps 5–6 of FIG. 2). As noted on FIG. 2, the data message exchange with central office D 12d, results in a determination that the forwarded terminating unit 18d is busy.

In the preferred embodiment, this determination that the forwarded terminating unit 18d is busy may also include a determination that no call rescue location is available or designated for routing of the communication. This determination as to call rescue location may be carried out by the intelligent peripheral (IP) 39 by consulting its information sources with respect to this subscriber. Call rescue locations may include a voice mail or facsimile mail service, paging service, or other such service associated with the subscriber. In addition, a call rescue location may include another directory number to which the communication is to be routed. If there is a call rescue location designated for the communication, then the intelligent peripheral (IP) preferably routes the communication to the call rescue location or takes whatever other steps are appropriate with respect to the communication and the call rescue location. Otherwise, the intelligent peripheral (IP) preferably proceeds as explained below in connection with the provision of a busy signal to the communication.

Still referring to FIGS. 1 and 2, assume a determination has been made that the terminating unit to which the communication would otherwise be forwarded is busy, and as appropriate, a determination has been made that no call rescue locations are designated for the communication. The intelligent peripheral (IP) 39 provides a message with respect to the communication to the central office C 12d which serves the intelligent peripheral (IP) 39. (See step 7 of FIG. 2). In the preferred embodiment, this message from the terminating network element is an ISDN release complete message pursuant to the ISDN protocol with a specification that a busy signal rather than a ring signal be provided. This message may also be known as a send release or release complete message. In particular, this message instructs the central office to play a busy signal to the communication. Upon receipt of this message, the central office C 12c plays the busy signal to the communication. (See step 8 of FIG. 2). Advantageously, the effect of this message is that a busy signal is provided to the communication without the communication having been terminated anywhere, and in particular, without the communication having been terminated at the intelligent peripheral (IP) 39. The intelligent peripheral (IP) 39 also releases the ISDN interface connection to the communication. In this manner, the originating caller associated with the communication hears a busy signal, but is not charged for the communication.

In other words, the intelligent peripheral (IP), according to the Q.9.31 North American ISDN standard protocol, preferably has four seconds to accept the communication. In this four second time frame, the software in the intelligent peripheral (IP) begins to transfer the communication to the forwarded terminating unit. If the intelligent peripheral (IP) receives ringing, denoting that the forwarded terminating unit is not busy, the intelligent peripheral (IP) continues to ring the forwarded terminating unit by sending the original call accept message. However, if the intelligent peripheral (IP) receives a busy signal, then the release complete message is delivered which will cause a busy signal to be played to the originating caller.

In conclusion, the steps of the preferred embodiment of the present invention are summarized with respect to the flow chart of FIG. 3. Prior to the start step 100, it is assumed that a communication has been forwarded over an integrated services digital network (ISDN) interface connection from a central office to a terminating network element for further routing of said communication to a terminating unit. It is further assumed that the terminating network element has determined that the terminating unit is busy and there is no call rescue location designated for said communication. The preferred embodiment of the present invention then provides a busy signal to the communication without the originating caller associated with the communication being charged for the communication. This is accomplished in step 102 by the provision of an ISDN release complete message with respect to the communication from the terminating network element to the central office. The ISDN release complete message serves to instruct the central office to play a busy signal to the communication. Then in step 104, the ISDN interface connection to the communication is released by the terminating network element.

Given the foregoing disclosure of the exemplary embodiments and design parameters for the present invention, other embodiments of the present invention will suggest themselves to those skilled in the art. Therefore, the scope of the present invention is to be limited only by the claims below.

I claim:

1. In a telecommunications network including a plurality of central offices, and including a terminating network element connected by an integrated services digital network (ISDN) interface connection to a first central office of said plurality of central offices, a system for providing a busy signal to a communication that has been forwarded to said terminating network element, said busy signal being provided without said terminating network element providing answer supervision for said communication, and thereby without the originating caller associated with said communication being charged for said communication, said system comprising:

said terminating network element being operative
to accept said communication over said ISDN interface connection from said first central office and to form an ISDN interface connection to said communication,
in response to acceptance of said communication, to determine the further routing of said communication to a terminating unit,
to make a check as to whether said terminating unit is busy, said check being carried out through the use of data messages between said terminating network element and a second central office, said second central office serving said terminating unit, and
if said terminating unit is busy,
to provide a message to said first central office, said message instructing said first central office to play a busy signal to said communication, and
to release said ISDN interface connection to said communication; and said first central office being operative in response to receipt of said message from said terminating network element to play said busy signal to said communication.

2. The system of claim 1, wherein said terminating network element is a service circuit node.

3. The system of claim 1, wherein said message is an ISDN release complete message.

4. The system of claim 1, wherein said terminating network element is further operative after determining that said terminating unit is busy to cause said terminating network element to determine whether there is a call rescue location designated for said communication, and if there is a call rescue location designated for said communication, then to route said communication to said call rescue location, and to refrain from providing said message to said first central office.

5. In a telecommunications network including a plurality of central offices, and including a terminating network element connected by an integrated services digital network (ISDN) interface connection to a first central office of said plurality of central offices, a method for providing a busy signal to a communication that has been forwarded to said terminating network element, said busy signal being provided without said terminating network element providing answer supervision for said communication, and thereby without the originating caller associated with said communication being charged for said communication, said method comprising the steps of:

(A) causing said communication to be accepted over said ISDN interface connection at said terminating network element and an ISDN interface connection being established with respect to said communication by said terminating network element;

(B) in response to acceptance of said communication, causing said terminating network element to determine the further routing of said communication;

(C) causing said terminating network element to make a check as to whether said terminating unit is busy through the use of data messages between said terminating network element and a second central office, said second central office serving said terminating unit;

(D) if said terminating unit is busy, then causing said terminating network element
(1) to provide a message to said first central office, said message instructing said first central office to play a busy signal to said communication,
(2) to release said ISDN interface connection to said communication; and (E) in response to receipt of said message from said terminating network element, causing said first central office to play said busy signal to said communication.

6. The method of claim 5, further comprising the steps of:

prior to said step D, and if said terminating unit is busy, then (F) causing said terminating network element to determining whether there is a call rescue location designated for said communication; and (G) if there is no call rescue location designated for said communication, then proceeding with said steps D–E.

7. The method of claim 6, further comprising the step of:

(H) if the determination in step F is that there is a call rescue location, then causing said terminating network element to route said communication to said call rescue location and to skip steps D–E.

* * * * *